March 13, 1934.  E. H. FAHRNEY  1,951,140
GLASS TUBE CUTTER
Filed Nov. 12, 1932   2 Sheets-Sheet 1
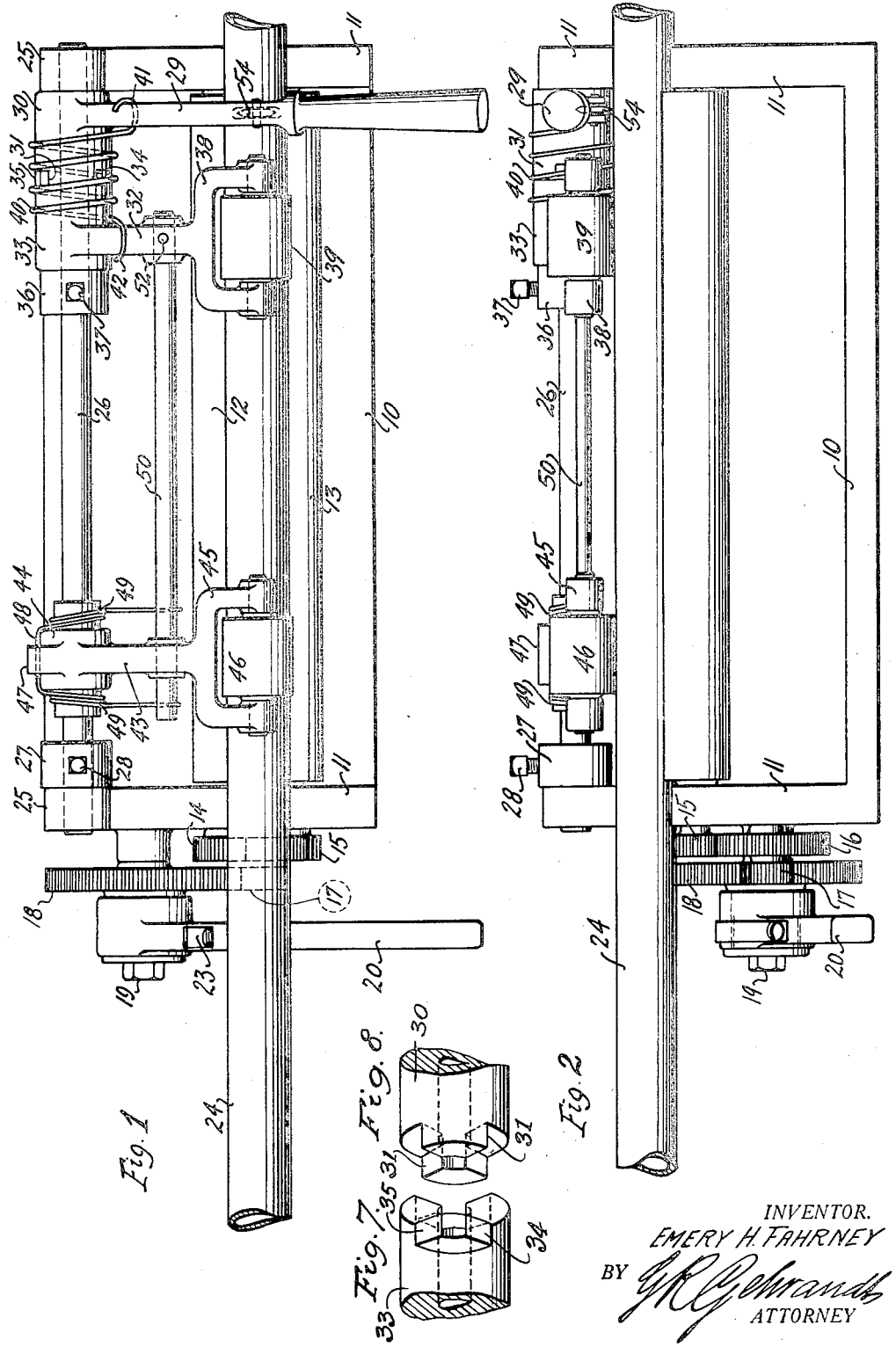
INVENTOR.
EMERY H. FAHRNEY
BY
ATTORNEY

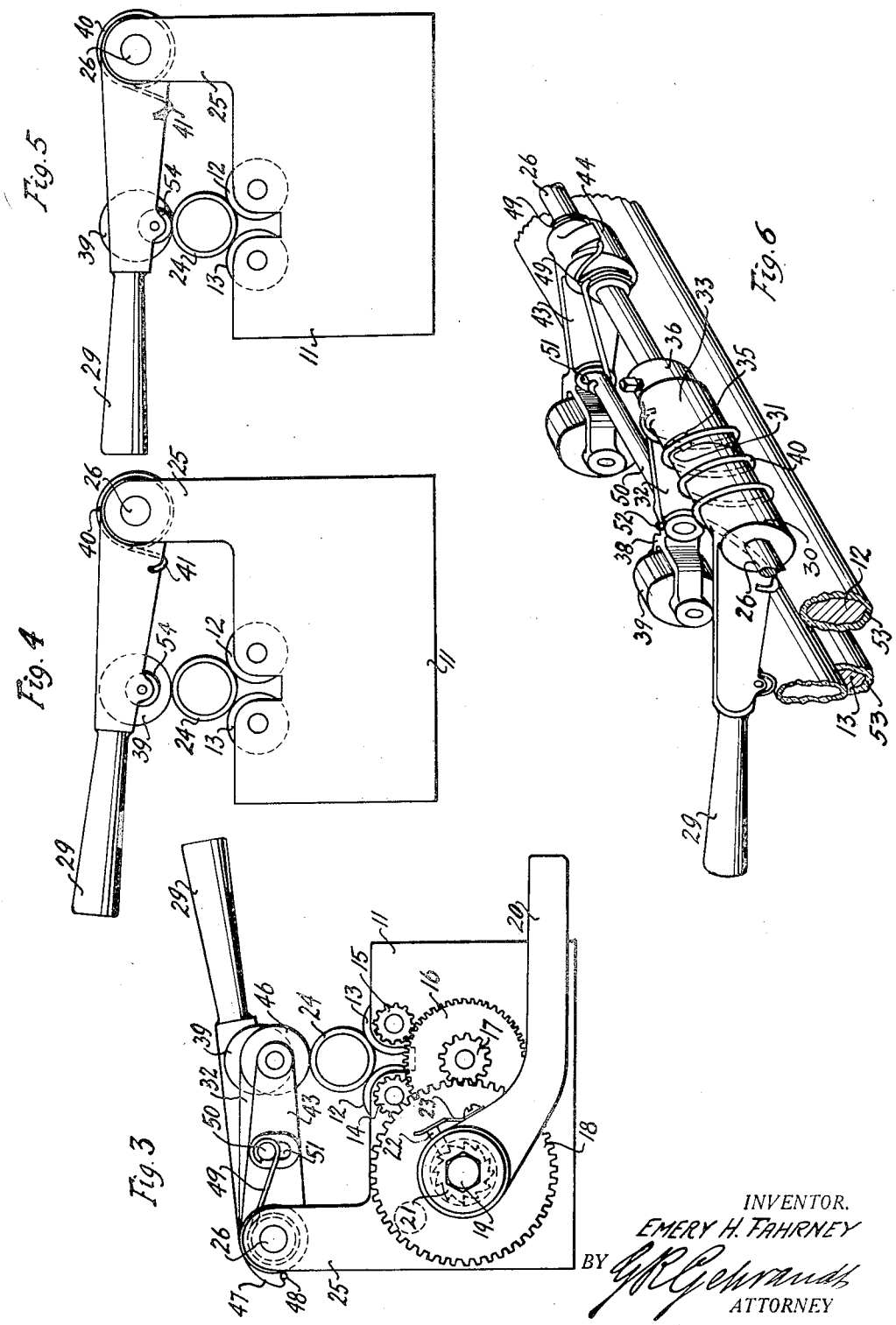

Patented Mar. 13, 1934

1,951,140

UNITED STATES PATENT OFFICE 1,951,140

GLASS TUBE CUTTER

Emery H. Fahrney, Chicago, Ill.

Application November 12, 1932, Serial No. 642,373

9 Claims. (Cl. 164—60)

This invention relates to improvements in tube cutting machines, particularly adapted, though not necessarily limited in its use, for cutting glass tubes, and one of the objects of the invention is to provide a machine of this character which will be of a simple and compact arrangement, and by means of the use of which tubes of varying diameters may be expeditiously cut.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a top plan view of a machine of this character constructed in accordance with the principles of this invention.

Figure 2 is a front elevation of Figure 1.

Figure 3 is a left hand end elevation of Figures 1 and 2, showing the parts in position just after the first pressure roller engages the tube and before the second pressure roller and cutter are brought into engagement with the tube.

Figure 4 is a right hand end elevation of Figure 1, with the parts in position with the two pressure rollers in contact with the tube and just before the cutter is brought into engagement with the tube.

Figure 5 is a view similar to Figure 4, showing the parts in the position they will assume during the cutting operation.

Figure 6 is a detail perspective view of a portion of the machine.

Figure 7 is a detail perspective view of one end of the handle bearing member.

Figure 8 is a detail perspective view of one end of the arm bearing member.

Referring more particularly to the drawings, the numeral 10 designates a suitable supporting base provided with uprights or standards 11, the latter being preferably shaped to form end walls. The base 10 may be of any desired length and journaled between the uprights 11 and extending across the space between the uprights are spaced parallel rollers 12—13, and to one end of the respective rollers are secured gears 14 and 15. These gears mesh with a single gear 16 journaled to the outside face of one of the uprights 11 and carried by the gear 16 and for rotation therewith, is a gear 17, which latter may be of any desired diameter, but preferably of a diameter considerably less than the diameter of the gear 16. Meshing with the gear 17 is a gear 18 which is journaled upon a stub shaft 19 and pivotally mounted upon the shaft 19 is an operating handle 20. Carried with the gear 18 for rotation therewith is a ratchet element 21 and carried by the operating handle 20 is a pawl or dog 22 controlled by a spring 23. The teeth of the ratchet element 21 are so arranged that when the operating handle 20 is raised the dog or pawl 22 will ride over the teeth of the ratchet. When the handle 20 is lowered, the pawl will engage the teeth of the ratchet element to rotate the latter, which in turn will rotate the gear 18, and this rotary motion will be imparted to the rollers 12 and 13 through the intermediate gears so as to cause the rollers to rotate in the proper direction with respect to each other. The rollers 12—13 form a support for the tube 24 which is to be cut.

Projecting above each of the uprights 11 are standards or bearing members 25, and loosely mounted in these bearings and extending across the frame is a shaft 26 which is held against longitudinal movement in its bearings 25 in one direction, in any desired or suitable manner, such as by means of a sleeve or collar 27 fastened to the shaft by means of a fastening device 28, in proximity to the inner face of one of the bearing members 25.

A handle or lever 29 is provided at one end with a bearing 30. The bearing 30 extends laterally beyond the handle and the extremity thereof is cut away to form a shoulder 31, for a purpose to be described. Also loosely mounted upon the shaft 26 and in proximity to the bearing 30 of the handle is an arm 32, the bearing 33 of which is provided with spaced shoulders 34—35, between which the shouldered portion 31 operates, and the distance between the shoulders 34—35 is greater than the width of the shoulder 31 so as to permit the handle 29 and bearing 30 to be rotated about the shaft 26 for a limited distance independently with respect to the arm 32. A sleeve or collar 36 is secured by means of a suitable fastening device 37 to the shaft 26, and this collar 36 serves the purpose of holding the bearing 33 in proximity to the bearing 30 and also serves as a means for preventing the shaft 26 from moving longitudinally in the opposite direction in its bearings.

The forward end of the arm 32 is preferably bifurcated as at 38 and journaled in the bifurcation is a roller 39 constructed of any suitable material, of any desired diameter and length. The arm 32 may be supported by means of a coil spring 40 which encompasses the bearing 33 of the arm 32 and the bearing 30 of the lever 29. One end of the spring 40 is anchored to the arm 29 as at 41 and the other end of the spring is secured as at 42 to the arm 32. The points of engagement of the ends of the spring 40 and the spring itself are so shaped that the spring will not only serve as a tension spring but will also serve as a means which tends normally to bring the bearings 30 and 33 together.

A similar arm 43 is provided with a bearing 44 at one end thereof, and this bearing 44 loosely receives the shaft 26 so that the arm 43 will be loosely mounted upon the shaft. The forward end of the arm 43 is bifurcated as at 45, and a roller 46 of any desired diameter and length and constructed of any suitable material is journaled in the bifurcation.

The bearing 44 is provided with a projection 47 and a spring 48 is looped under the projection 47 and then coiled as at 49 around the bearing on opposite sides of the arm, the forward ends of the spring 49 being spaced from each other and engaging under a bar or rod 50, which latter passes through an elongated slot 51 in the arm 43, as shown more clearly in Figure 6. The other end of the bar or rod 50 is secured as at 52 to the arm 32 and is movable with the arm 32. By the provision of the slot 51 into which the bar or rod 50 projects at one end, it will be manifest that the arms 32 and 43 while being raised and lowered by means of the handle or lever 29, will be adapted for independent movement one with respect to the other and for a limited distance.

The rollers 12 and 13 may, if desired, be provided with a covering 53 of any suitable material, preferably a material to create friction with the tube 24 to cause the latter to rotate.

In use, the lever or handle 29 is raised, causing the shoulder 31 on the bearing 30 to contact with the shoulder 35 on the bearing 33 of the sleeve 32. This will raise the arm 32 and with it the bar or rod 50. The bar will then move in the slot 51 until it engages the upper end of the slot, at which time a further movement of the lever or handle 29 will cause the arm 43 to be raised.

The tube 24 is then placed in position upon the rollers 12 and 13, after which the handle or lever 29 is lowered into the position shown in Figure 3, that is so as to permit the roller 46 in the arm 43 and the roller 39 in the arm 32 to contact with the tube, and this contact will be made directly above the space between the rollers 12 and 13. The spring 40 permits of a pressure being exerted upon the rollers 39—46 so as to hold the tube against the rollers 12 and 13. While the operator holds the lever or handle 29 with one hand, he may operate the handle or lever 20 with the other hand and thereby operate the ratchet mechanism 21—22, to rotate the gear 18 and this in turn will rotate the rollers 12 and 13, together with the tube 24 and the rollers 39—46.

Suitably mounted in the handle or lever 29 is a cutter 54 which may be of any desired or suitable size and configuration adapted to be moved into contact with the tube 24, and when in contact will cut the tube during the rotation of the latter and will be held in cutting relation to the tube by pressure exerted upon the handle 29. The spring 40 as well as the spring 48 will permit the respective arms 32 and 43 to yield so as to avoid injury or damage to the tube. By reason of the slot 51 and the end of the rod 50 moving therein, it will be manifest that when the handle or lever 29 is lowered, one of the rollers 39—46 will be moved into contact with the tube 24 in advance of the other roller. At the same time this connection between the arms 32 and 43 will permit the rollers 39—46 to be bodily moved one with relation to the other to compensate any irregularity in the surface of the tube.

With this improved construction it will be manifest that there is provided a hand operative device which will be absolutely under the control of the operator and which will expeditiously cut the tubes. The speed of rotation of the rollers 12 and 13 will be at all times under the control of the operator through the manipulation of the lever 20.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a tube cutting machine, spaced work supporting rollers rotatable about parallel axes, means for rotating the rollers, a pair of arms mounted for oscillation about horizontal axes, pressure rollers journaled upon the arms and adapted to contact a tube resting upon said supporting rollers, an operating handle, a resiliently yielding connection between said handle and one of said arms, a member secured to one of said arms to project laterally therefrom and extending into a slot in the other arm, said slot being of a length considerably greater than the diameter of the portion of the said member within the slot, and a resiliently yielding connection between the last said arm and the said member, whereby both of said arms will be movable about their axes by the said handle and said arms will be adapted for movement about their respective axes for a limited distance independently one with relation to the other.

2. In a tube cutting machine, spaced work supporting rollers rotatable about parallel axes, means for rotating the rollers, a pair of arms mounted for oscillation about horizontal axes, pressure rollers journaled upon the arms and adapted to contact a tube resting upon said supporting rollers, an operating handle, a resiliently yielding connection between said handle and one of said arms, a member secured to one of said arms to project laterally therefrom and extending into a slot in the other arm, said slot being of a length considerably greater than the diameter of the portion of the said member within the slot, and a resiliently yielding connection between the last said arm and the said member, whereby one of said pressure rollers will be movable into engagement with the work in advance of the other roller.

3. In a tube cutting machine, spaced work supporting rollers rotatable about parallel axes, manual means for rotating the rollers, a pair of arms mounted for oscillation about horizontal axes, pressure rollers journaled upon the arms and adapted to contact a tube resting upon said supporting rollers, an operating handle, a resiliently yielding connection between said handle and one of said arms, a member secured to one of said arms to project laterally therefrom and extending into a slot in the other arm, said slot being of a length considerably greater than the diameter of the portion of the said member within the slot, and a resiliently yielding connection between the last said arm and the said member, whereby one of said pressure rollers will be movable into engagement with the work in advance of the other roller.

4. In a tube cutting machine spaced work supporting rollers rotatable about horizontal axes, pawl and ratchet mechanism embodying a manually operated lever for actuating said rollers, a pair of separate supports oscillatable about horizontal axes, pressure rollers carried by the supports, an operating handle, a resiliently yielding connection between said operating handle and one of said supports for swinging the latter about its axis, and means forming a resiliently yielding connection between said pressure roller supports whereby upon actuation of said handle, said pressure rollers will be moved into engagement with the work, one in advance of the other.

5. In a tube cutting machine spaced work supporting rollers rotatable about horizontal axes, means for actuating said rollers, a pair of separate supports oscillatable about horizontal axes, pressure rollers carried by the supports, an operating handle, a resiliently yielding connection between said operating handle and one of said supports for swinging the latter about its axis, and means forming a resiliently yielding connection between said pressure roller supports whereby upon actuation of said handle, said pressure rollers will be moved into engagement with the work, one in advance of the other.

6. In a tube cutting machine spaced work supporting rollers rotatable about horizontal axes, means for actuating said rollers, a pair of separate supports oscillatable about horizontal axes, pressure rollers carried by the supports, an operating handle, a resiliently yielding connection between said operating handle and one of said supports for swinging the latter about its axis, means forming a resiliently yielding connection between said pressure roller supports whereby upon actuation of said handle, said pressure rollers will be moved into engagement with the work, one in advance of the other, and additional means adapted to form a positive connection between said handle and one of said pressure roller supports for positively swinging the latter about its axis.

7. In a tube cutting machine spaced work supporting rollers rotatable about horizontal axes, means for actuating said rollers, a pair of separate supports oscillatable about horizontal axes, pressure rollers carried by the supports, an operating handle, a resiliently yielding connection between said operating handle and one of said supports for swinging the latter about its axis, means forming a resiliently yielding connection between said pressure roller supports whereby upon actuation of said handle, said pressure rollers will be moved into engagement with the work, one in advance of the other, and a cutter carried by the handle for engagement with the work.

8. In a tube cutting machine spaced work supporting rollers rotatable about horizontal axes, means for rotating the rollers, a fixed support, pressure roller supports independently pivoted thereto, an operating handle also pivotally connected with the said fixed support, a resiliently yielding connection between said handle and one of the pressure roller supports, a slot in one of the pressure roller supports, a member projecting into and laterally movable in said slot, said member being fixedly connected with the other of the pressure roller supports, and a resiliently yielding connection between one of said pressure roller supports and said member.

9. In a tube cutting machine spaced work supporting rollers rotatable about horizontal axes, means for rotating the rollers, a fixed support, pressure roller supports independently pivoted thereto, an operating handle also pivotally connected with the said fixed support, a resiliently yielding connection between said handle and one of the pressure roller supports, a slot in one of the pressure roller supports, a member projecting into and laterally movable in said slot, said member being fixedly connected with the other of the pressure roller supports, a resiliently yielding connection between one of said pressure roller supports and said member, and shoulders provided on one of said pressure roller supports and said handle and movable into engagement with each other by the operation of said handle, to positively move the last said support about its axis.

EMERY H. FAHRNEY.